(12) United States Patent
Aoyama

(10) Patent No.: US 8,345,142 B2
(45) Date of Patent: Jan. 1, 2013

(54) IMAGING APPARATUS

(75) Inventor: Satoshi Aoyama, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 655 days.

(21) Appl. No.: 12/353,688

(22) Filed: Jan. 14, 2009

(65) Prior Publication Data

US 2009/0185063 A1    Jul. 23, 2009

(30) Foreign Application Priority Data

Jan. 22, 2008  (JP) ................................. 2008-011733

(51) Int. Cl.
*H04N 5/222* (2006.01)
(52) U.S. Cl. .......... 348/333.05; 348/333.01; 348/333.12
(58) Field of Classification Search ............. 348/333.01, 348/333.05, 333.12
See application file for complete search history.

(56) References Cited

U.S. PATENT DOCUMENTS

| | | |
|---|---|---|
| 7,505,074 B2 | 3/2009 | Yoshino et al. |
| 2005/0174457 A1 | 8/2005 | Yoshino et al. |
| 2008/0024643 A1* | 1/2008 | Kato ........................ 348/333.01 |

FOREIGN PATENT DOCUMENTS

| | | |
|---|---|---|
| CN | 1652573 A | 8/2005 |
| JP | 2003-179798 A | 6/2003 |

* cited by examiner

*Primary Examiner* — Dharti Patel
(74) *Attorney, Agent, or Firm* — Canon USA Inc IP Division

(57) ABSTRACT

An imaging area image is displayed on a monitor instead of an enlarged image after a focus state is maintained by an operation of a second operation member used for instructing maintenance of the focus state, if a first operation member configured to issue an instruction to start focus control is re-operated.

6 Claims, 7 Drawing Sheets

IMAGING APPARATUS

BACKGROUND OF THE INVENTION

1. Field of the Invention

The present invention relates to an imaging apparatus having a function to display an enlarged image of a part of an imaging area image.

2. Description of the Related Art

An imaging apparatus such as a digital camera includes a display used by a user in confirming an imaging angle or a state of an object, or in viewing a recorded image.

However, today's imaging apparatus is very small and the size of the display is limited. Further, the resolution of the display is much lower compared to that of a recorded image. As a consequence, it is difficult to confirm the details of the object on the display.

Under these circumstances, Japanese Patent Application Laid-Open No. 2003-179798 discusses an imaging apparatus. When a shutter button is half-pressed, an auto-focus area of an object is enlarged and shown on a display with high resolution. Thus, a user can easily confirm the details or an actual focus state of the object.

According to the imaging apparatus discussed in Japanese Patent Application Laid-Open No. 2003-179798, an enlarged focus area is displayed when the shutter button is half-pressed. However, display of an enlarged image is not always necessary in actually using a camera. For example, some imaging apparatuses include an autofocus (AF) lock function. When the user focuses on an object using the autofocus function and uses the AF lock function, the in-focus state can be maintained. The AF lock function is used when the user changes an angle of view while maintaining the in-focus state, or the user waits until the state of the object, which is in-focused, becomes appropriate for shooting. When the state of the object becomes appropriate, then the shooting is performed.

When the object moves out of the focus area in a state the AF lock function is used, even if the user half-presses the shutter button, the object is not included in the enlarged display of the focus area. Further, in using the AF lock function, displaying the enlarged image of the object again after confirming the details of the object and the focus state using the enlarged display, has little meaning. Such an operation may rather cause inconvenience to the user.

SUMMARY OF THE INVENTION

The present invention is directed to an imaging apparatus which is capable of displaying an enlarged image in an appropriate manner when an AF lock function is used, and a display control method therefor.

According to an aspect of the present invention, an imaging apparatus includes an image sensor, an operation member configured to issue an instruction for start of a focus control, a display control unit configured to display an imaging area image generated using output from the image sensor on a monitor, and a storage unit configured to store an object included in the imaging area image when a focus state is maintained according to an operation of the operation member. When the operation member is operated, the display control unit displays an enlarged image of a portion of the imaging area image on the monitor if the object stored in the storage unit is included in the imaging area. When the operation member is operated, the display control unit does not display an enlarged image of a portion of the imaging area image on the monitor if the object stored in the storage unit is not included in the imaging area.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DETAILED DESCRIPTION OF THE EMBODIMENTS

Various exemplary embodiments, features, and aspects of the invention will be described in detail below with reference to the drawings.

Figure 1:
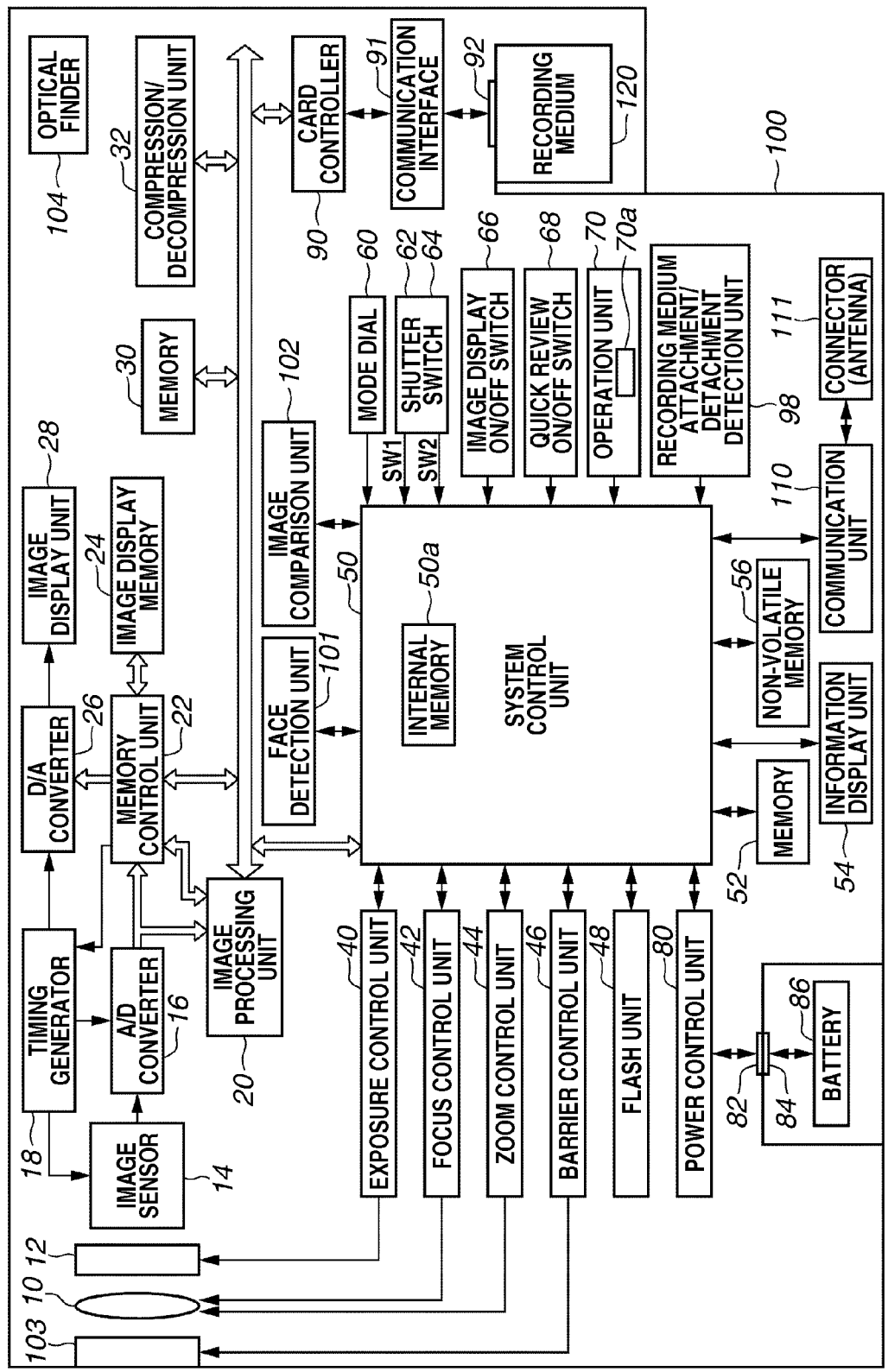
FIG. 1 is a block diagram illustrating a configuration of a digital camera according to an exemplary embodiment of the present invention.

FIG. 1 illustrates a configuration of a digital camera as an imaging apparatus according to an exemplary embodiment of the present invention.

In FIG. 1, a digital camera (hereinafter referred to as a camera) 100 includes an imaging lens 10 as an imaging optical system and a shutter 12 having a diaphragm function. An image sensor 14 is a sensor such as a charge-coupled device (CCD) sensor or a complementary metal oxide semiconductor (CMOS) sensor used for photoelectrically converting an optical image (object image) into an electric signal. An analog-to-digital (A/D) converter 16 converts an analog signal output from the image sensor 14 into a digital signal.

A timing generator 18 supplies a clock signal to the image sensor 14, the A/D converter 16, and a digital-to-analog (D/A) converter 26. The timing generator 18 is controlled by a memory control unit 22 and a system control unit 50 which is described below.

An image processing unit 20 performs various types of image processing such as pixel interpolation processing, color conversion processing, and automatic white balance (AWB) processing with respect to a digital imaging signal output from the A/D converter 16 or a memory control unit 22. In this way, image data is generated.

Further, the image processing unit 20 performs predetermined calculation using the generated image data. Based on a result of the calculation, the system control unit 50 controls an exposure control unit 40, a focus control unit 42, and a flash unit 48. According to the control of the system control unit 50, autofocus (AF) processing of the through-the-lens (TTL) system, automatic exposure (AE) processing, and EF (pre-flash) processing are performed. Further, the image processing unit 20 performs the predetermined calculation using the generated image data and performs automatic white balance (AWB) processing of the TTL system based on the result of the calculation.

The memory control unit 22 is configured to control the A/D converter 16, the timing generator 18, the image processing unit 20, an image display memory 24, the D/A converter 26, a memory 30, and a compression/decompression unit 32.

The image data output from the image processing unit 20 or the digital imaging signal output from the A/D converter 16 is written in the image display memory 24 or the memory 30 by the memory control unit 22.

An image display unit 28 is a display unit including, for example, a liquid crystal display (LCD). Display image data written in the image display memory 24 (hereinafter referred to as an EVF image) is sent to the image display unit 28 via the D/A converter 26. An electronic viewfinder (EVF) function is realized by displaying the EVF image on the image display unit 28.

The EVF image is an image which is generated based on an output from substantially the entire effective imaging plane of the image sensor 14 or an image of the entire angle of view. In other words, the EVF image is an image that corresponds to the whole imaging area which is captured by the camera 100. In the following description, the EVF image is also referred to as an imaging area image.

The memory 30 is used for storing generated still image or moving image. Further, the memory 30 is used as a working area of the system control unit 50.

The compression/decompression unit 32 compresses and decompresses the image data using, for example, adaptive discrete cosine transform (ADCT). The compression/decompression unit 32 performs compression or decompression of the image data stored in the memory 30 and writes the resultant data in the memory 30.

The exposure control unit 40 controls the shutter 12. The exposure control unit 40 includes a flash light amount control function that associates with the flash unit 48.

The focus control unit 42 performs autofocus control (AF processing) of the imaging lens 10 together with the system control unit 50. Details of the AF processing will be described below. As a result of the AF processing, an in-focus state of an object (a focus target) using the imaging lens 10 is obtained.

A zoom control unit 44 controls zooming of the imaging lens 10.

A barrier control unit 46 controls operation of a lens barrier 103. The flash unit 48 emits illumination light onto the object. The flash unit 48 also includes a floodlight function by AF auxiliary light and the above-described flash light amount control function.

The exposure control unit 40 and the focus control unit 42 are controlled according to the TTL system. In other words, the system control unit 50 controls the exposure control unit 40 and the focus control unit 42 based on a result of the calculation which is obtained using the image data generated by the image processing unit 20. Further, the system control unit 50 controls the whole operation of the camera 100 as well as the operation of the exposure control unit 40 and the focus control unit 42. Further, the system control unit 50 also functions as a display control unit and controls display of the EVF image or an enlarged image on the image display unit 28.

A memory 52 is used for storing data such as a constant, a variable, or a computer program used for operation of the system control unit 50.

An information display unit 54 outputs a message or information about an operating state of the camera 100 using text, image, or speech. The information display unit 54 includes a liquid crystal display element and a speaker. The information display unit 54 displays some of the information on a finder screen via an optical finder 104.

A non-volatile memory 56 is a memory which is electrically erasable and programmable. For example, an electrically erasable and programmable read-only memory (EEPROM) is used for the non-volatile memory 56.

A mode dial 60 is used for switching and setting various modes including a shooting mode (a still image shooting mode or a moving image shooting mode) and a reproducing mode. Further, the mode dial 60 functions as a power switch used for turning on/off power of the camera 100.

An imaging preparation switch (SW1) 62 is turned on at a first stroke operation (half-press operation: first operation) of a shutter button (not shown). The imaging preparation switch (SW1) 62 is used for instructing start of an imaging preparation operation of AE processing or AF processing based on the light metering result. The shutter button and the imaging preparation switch (SW1) 62 constitute a first operation member.

An image record switch (SW2) 64 is turned on at a second stroke operation (full-press operation: second operation) of the shutter button. The image record switch (SW2) 64 is used for starting an imaging and recording operation. The imaging and recording operation includes operations such as an opening/closing operation of the shutter 12, an image data generation operation performed by the image processing unit 20 based on the image signal output from the image sensor 14, and a writing operation of the image data in the memory 30 performed via the memory control unit 22. The imaging and recording operation further includes reading the image data from the memory 30, compressing the image data by the compression/decompression unit 32, and recording the compressed data in a recording medium 120. This sequence of imaging and recording operations can also be regarded as operations for acquiring a recording image.

An image display on/off switch 66 is used for turning on or turning off display of the image display unit 28.

A quick review on/off switch 68 is used for setting a quick review function for auto-playing the captured image data immediately after the imaging. According to the present exemplary embodiment, the camera 100 includes a function to set the quick review function when the image display unit 28 is turned off.

An operation unit 70 includes various buttons and a touch panel. The operation unit 70 displays a menu screen which allows the user to select a function of the camera 100 or make a setting for the camera 100, or is operated to select a menu item. The operation unit 70 includes an AF lock setting button 70a as a second operation member used for giving instruction to maintain the focus state.

A power control unit 80 includes a battery detection unit configured to detect a remaining battery level, a DC-DC converter configured to convert voltage supplied from a battery into a predetermined operation voltage, and a switch unit configured to switch a current-carrying block.

A battery 86 is a battery including a primary battery such as an alkaline battery or a lithium battery, or a secondary battery such as a nickel metal hydride (NiMH) battery or a Li battery. Connectors 82 and 84 are used for electrically connecting the battery 86 and the camera 100.

A card controller 90 is used for communication with the recording medium 120. A communication interface 91 is an interface for the recording medium 120. A connector 92 is connected to the recording medium 120. Compressed image data or voice data output from the camera 100 is recorded in the recording medium 120. The recording medium 120 includes, for example, a semiconductor memory or an optical disk.

A recording medium attachment/detachment detection unit 98 is configured to detect whether the recording medium 120 is attached to the connector 92.

A communication unit 110 includes various communication functions such as RS232C, USB, IEEE 1394, and wireless communication.

A connector 111 allows the camera 100 to connect with other apparatuses by using the communication unit 110. An antenna is connected when radio communication is used.

A face detection unit 101 is a unit serving as an object detection unit. The face detection unit 101 analyzes the image data generated by the image processing unit 20 or the image data stored in the image display memory 24 and then detects an area (face area) which is assumed to be a face from the image data. When the face detection unit 101 detects the face area, the face detection unit 101 also outputs a probability of the detected face as a person's face, and face information about a position and a size of the face area included in the input image data. Further, the face detection unit 101 outputs a feature quantity at a feature point of the detected face.

An image comparison unit 102 is configured to detect a difference between two images stored in the image display memory 24 or the memory 30 by performing pattern matching based on color information.

The system control unit 50, the face detection unit 101, and the image comparison unit 102 constitute a display control unit.

Figure 2:
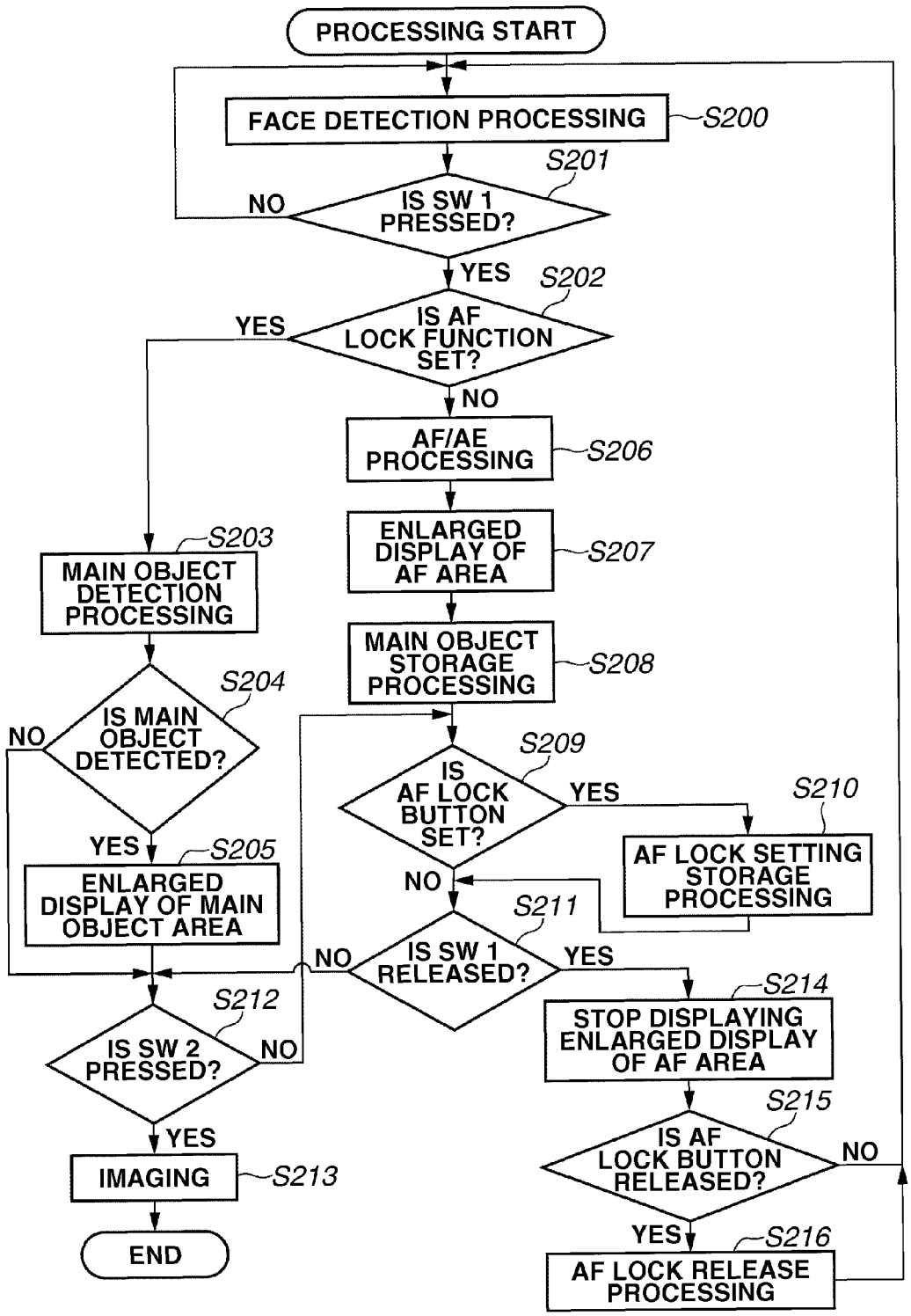
FIG. 2 is a flowchart of a process performed according to a first exemplary embodiment of the present invention.

Next, display processing (display control method) and imaging processing according to the present exemplary embodiment will be described referring to FIG. 2. Each of the display processing and the imaging processing is executed by the system control unit 50 controlling each of the above-described units according to the computer program stored in the memory 52. Further, the same applies to other exemplary embodiments which are described below.

In step S200, the system control unit 50 instructs the face detection unit 101 to perform the face detection processing. The face detection unit 101 performs the face detection processing using the EVF image (imaging area image) stored in the image display memory 24 as an input image. The face detection is performed by comparing an arrangement or color of a feature point of a person with a feature point in the input image. The feature point is, for example, an eye or a mouth of a person. The feature point is stored in advance as a pattern. The face detection processing can also be performed with respect to the image data that corresponds to the whole imaging area generated by the image processing unit 20 (imaging area image).

If the face detection unit 101 detects only one face from the input image, the system control unit 50 determines the face as the face of the main object. If the face detection unit 101 detects a plurality of faces from the input image, the system control unit 50 sorts-out a face which is assumed to be the face of the main object out of the plurality of faces. This is performed by using the face information, such as the probability of the face or the size of the face, which is output from the face detection unit 101. Then the system control unit 50 determines the sorted-out face as the face of the main object.

An area including the face of the main object determined in this way is set by the system control unit 50 as an AF area (focus area), which is a focus target area of the autofocus operation. At this time, the system control unit 50 can instruct the image display unit 28 to display a frame that surrounds the AF area so that the user can easily recognize the AF area. Further, if a face is not detected from the input image, the system control unit 50 sets an area which is set in advance (e.g., center area of the image) as the AF area.

In step S201, the system control unit 50 determines whether the imaging preparation switch (SW1) 62 is pressed (i.e., turned on). If the imaging preparation switch (SW1) 62 is not pressed (NO in step S201), then the process returns to step S200. If the imaging preparation switch (SW1) 62 is pressed (YES in step S201), then the process proceeds to step S202.

In step S202, the system control unit 50 determines whether the AF lock setting button 70a is operated by the user prior to this step, and whether the AF lock function is set and the camera 100 is in an AF lock state. The AF lock function is used for maintaining a focus state of the imaging lens 10 acquired at the time the AF lock setting button 70a is operated. If the camera 100 is not in the AF lock state (NO in step S202), the process proceeds to step S206.

In step S206, the system control unit 50 executes the AF processing (focus control) with respect to the AF area set in step S200 using the focus control unit 42 and obtains an in-focus state. Further, using the exposure control unit 40, the system control unit 50 performs the AE processing so that the main object included in the AF area is appropriately exposed.

Figure 5:
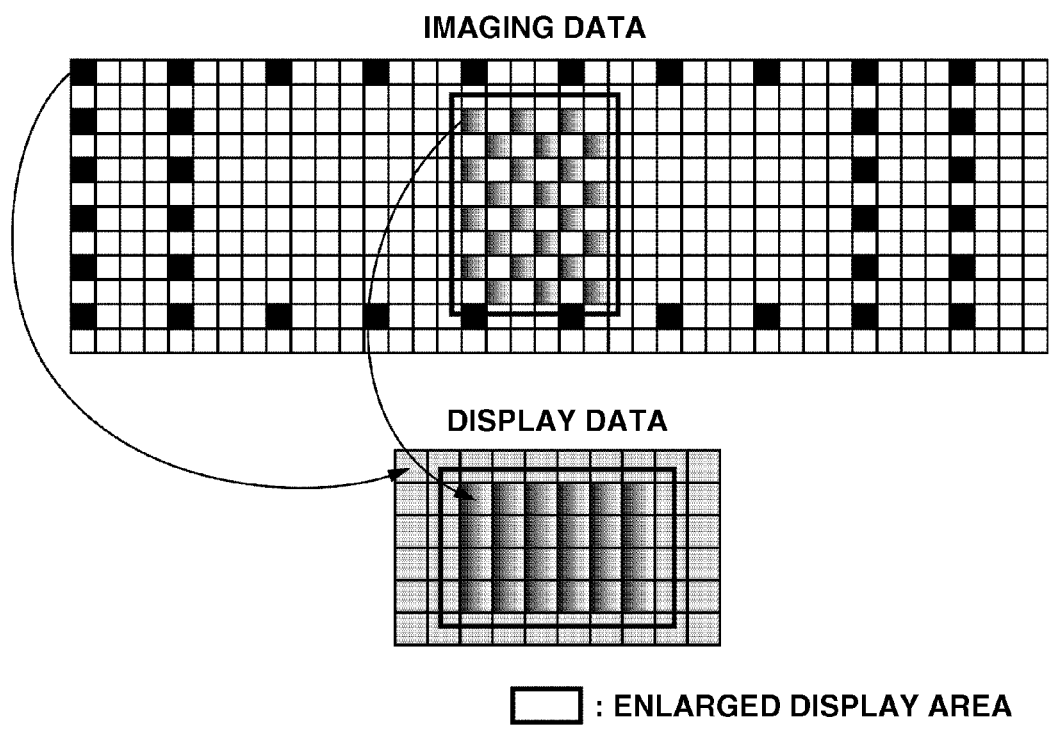
FIG. 5 illustrates an example of an enlarged image display according to an exemplary embodiment of the present invention.

Next, in step S207, the system control unit 50 instructs the image display unit 28 to superpose and display an enlarged image of the AF area, which is a part of the imaging area, over the imaging area image. FIG. 5 illustrates a method for generating the enlarged image performed by the image processing unit 20.

The imaging area image (display data) displayed on the image display unit 28 is generated by taking out some of pixel data of the imaging data read out by the image sensor 14 for image recording. Then, an image is generated that has a number of pixels that equals the horizontal and vertical number of pixels of the image display unit 28. The gray portion of the imaging data in FIG. 5 is the pixel data taken out from the imaging data.

With respect to the area to be enlarged, the take-out rate of the pixel data is higher than that of the display data as illustrated in the area within the bold frame in FIG. 5. By increasing the take-out rate of the pixel data, an enlarged image compared to the imaging area image can be obtained and details of the object included in the enlarged image can be displayed.

Figure 6:
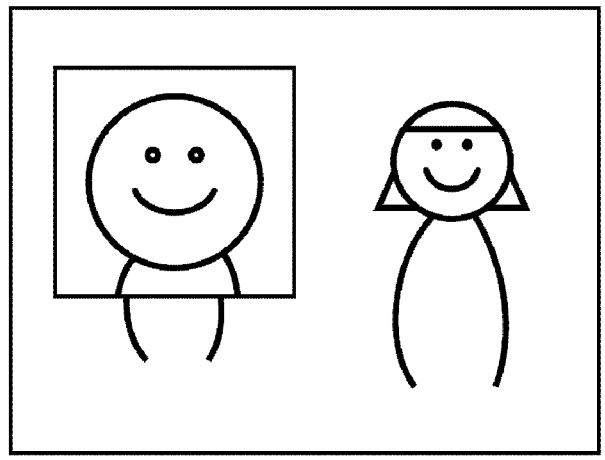
FIG. 6 illustrates an example of an image display according to the first exemplary embodiment of the present invention.

According to the present exemplary embodiment, since the AF area in the imaging area image is displayed at an magnification rate different from the rest of the imaging area, the user can easily confirm details of the main object in the AF area. FIG. 6 illustrates an example of an enlarged image (image surrounded by a thin frame) superposed over the imaging area image.

FIG. 6 illustrates a case where two people are imaged. If the face of the person on the left side is set as the main object according to the face detection processing, then the area including the face of the person on the left side is set as the AF area. When the AF processing is being performed on the AF area, an enlarged image of the AF frame will be displayed.

Next, in step S208, the system control unit 50 stores the image data of the AF area in the internal memory 50a. More specifically, the system control unit 50 stores the image data of the area including the face of the person on the left side in FIG. 6 in the internal memory 50a. This is equivalent to storing the main object included in the imaging area image.

Next, in step S209, the system control unit 50 determines whether the AF lock setting button 70a is operated by the user. More specifically, the system control unit 50 determines whether the AF lock setting button 70a is operated while the enlarged image of the AF area of the imaging area including the main object is displayed on the image display unit 28 and the focus state is maintained. If the AF lock setting button 70a is operated (YES in step S209), then the process proceeds to step S210. In step S210, the system control unit 50 stores the data of the AF frame and the data indicating that the camera 100 is in the AF lock state, in the internal memory 50a. At this time, the image display unit 28 can also display a message or the like indicating that the camera 100 is in the AF lock state. After then, the process proceeds to step S211. If the AF lock setting button 70a is not operated (NO in step S209), then the process proceeds to step S211.

In step S211, the system control unit 50 determines whether the imaging preparation switch (SW1) 62 is still pressed. If the imaging preparation switch (SW1) 62 is still pressed (NO in step S211), then the process proceeds to step S212. In step S212, the system control unit 50 determines whether the image record switch (SW2) 64 is pressed. If the image record switch (SW2) 64 is not pressed (NO in step S212), then the process returns to step S209. If the image record switch (SW2) 64 is pressed (YES in step S212), then in step S213, the system control unit 50 performs the imaging processing (imaging and recording operation).

On the other hand, in step S211, if the imaging preparation switch (SW1) 62 is not pressed (YES in step S211), then the process proceeds to step S214. In step S214, the system control unit 50 finishes (cancels) the display of the enlarged image of the AF frame on the image display unit 28 and the camera 100 returns to a state where a normal imaging area image (EVF image) is displayed.

Next, in step S215, the system control unit 50 determines whether the user operated an AF lock release button (not shown) included in the operation unit 70 and whether the AF lock is released. If the AF lock is released (YES in step S215), then in step S216, the system control unit 50 performs AF lock release processing. According to the AF lock release processing, the system control unit 50 deletes data of the AF area or image data within the AF area stored in the internal memory 50a. If a message is displayed on the image display unit 28 indicating that the camera 100 is in the AF lock state, then the system control unit 50 removes such a message. After that, the process returns to step S200.

In step S215, if the AF lock is not released (NO in step S215), then the process returns to step S200.

In step S201, the system control unit 50 determines whether the imaging preparation switch (SW1) 62 is pressed. In the check made by the control unit 50 when the process returns from step S215 to step S201, it is determined whether the camera 100 is in the AF lock state and, further, whether the imaging preparation switch (SW1) 62 is re-operated in a state the display of the enlarged image of the AF frame is cancelled. If the imaging preparation switch (SW1) 62 is re-operated (YES in step S201), then the process proceeds to step S202. If the imaging preparation switch (SW1) 62 is not re-operated (NO in step S201), then the process returns to step S200.

In step S202, if the camera 100 is in the AF lock state (YES in step S202), then the process proceeds to step S203.

In step S203, the system control unit 50 instructs the image comparison unit 102 to perform main object detection processing. To be more precise, the system control unit 50 instructs the image comparison unit 102 to detect whether the image including the main object (i.e., the main object) stored in the internal memory 50a in step S208 is currently (at the time the imaging preparation switch 62 is re-operated) included (exists) in the imaging area image displayed on the image display unit 28. The image comparison unit 102 detects whether the image including the main object stored in the internal memory 50a is included in the current imaging area image by performing the pattern matching using the image stored in the internal memory 50a and the imaging area image stored in the image display memory 24.

Next, in step S204, if the image including the main object stored in the internal memory 50a is determined that it is included in the current imaging area image, by the image comparison unit 102 (YES in step S204), then the process proceeds to step S205.

In step S205, the system control unit 50 displays an enlarged image of the area within the current imaging area where the image including the main object stored in the internal memory 50a was detected in step S204. Then, the process proceeds to step S212.

On the other hand, in step S204, if the image including the main object stored in the internal memory 50a is determined not to be included in the current imaging area image (NO in step S204), then the process proceeds to step S212 without displaying the enlarged image.

Figure 7:
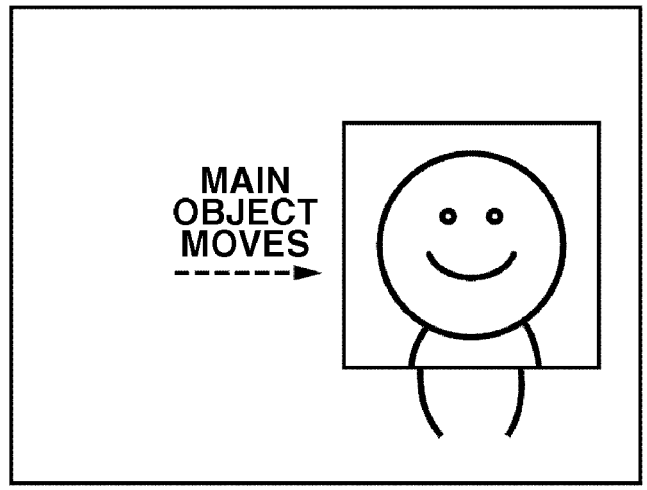
FIG. 7 illustrates another example of the image display according to the first exemplary embodiment of the present invention.

According to the present exemplary embodiment, after the AF locking is set in an imaging composition as illustrated in FIG. 6, even if the main object moves or the user moves the camera so that the imaging composition is changed to, for example, the composition as illustrated in FIG. 7, enlarged display of the image in the AF frame including the main object can be displayed only when the user re-operates the imaging preparation switch (SW1) 62. Thus, the user can efficiently confirm the details of the main object again.

Figure 8:
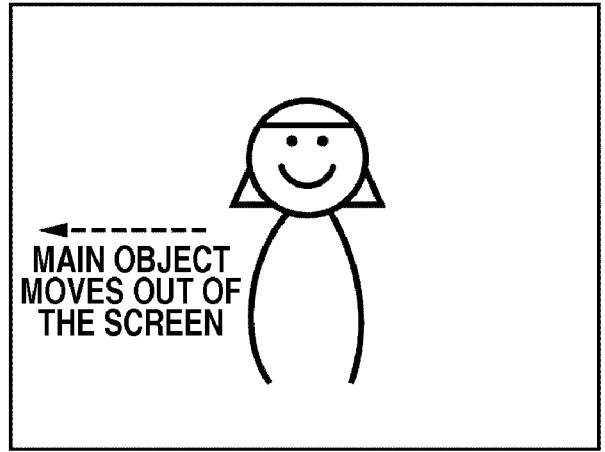
FIG. 8 illustrates yet another example of the image display according to the first exemplary embodiment of the present invention.

On the other hand, after the AF locking is set in the imaging composition as illustrated in FIG. 6, if the main object moves out of the imaging area and the imaging composition is changed to what is illustrated in FIG. 8, an enlarged image will not be displayed. In this way, if a main object which is a target of the AF locking does not exist, an enlarged image of the object will not be displayed. Thus, the inconvenience of the user can be spared.

Figure 3:
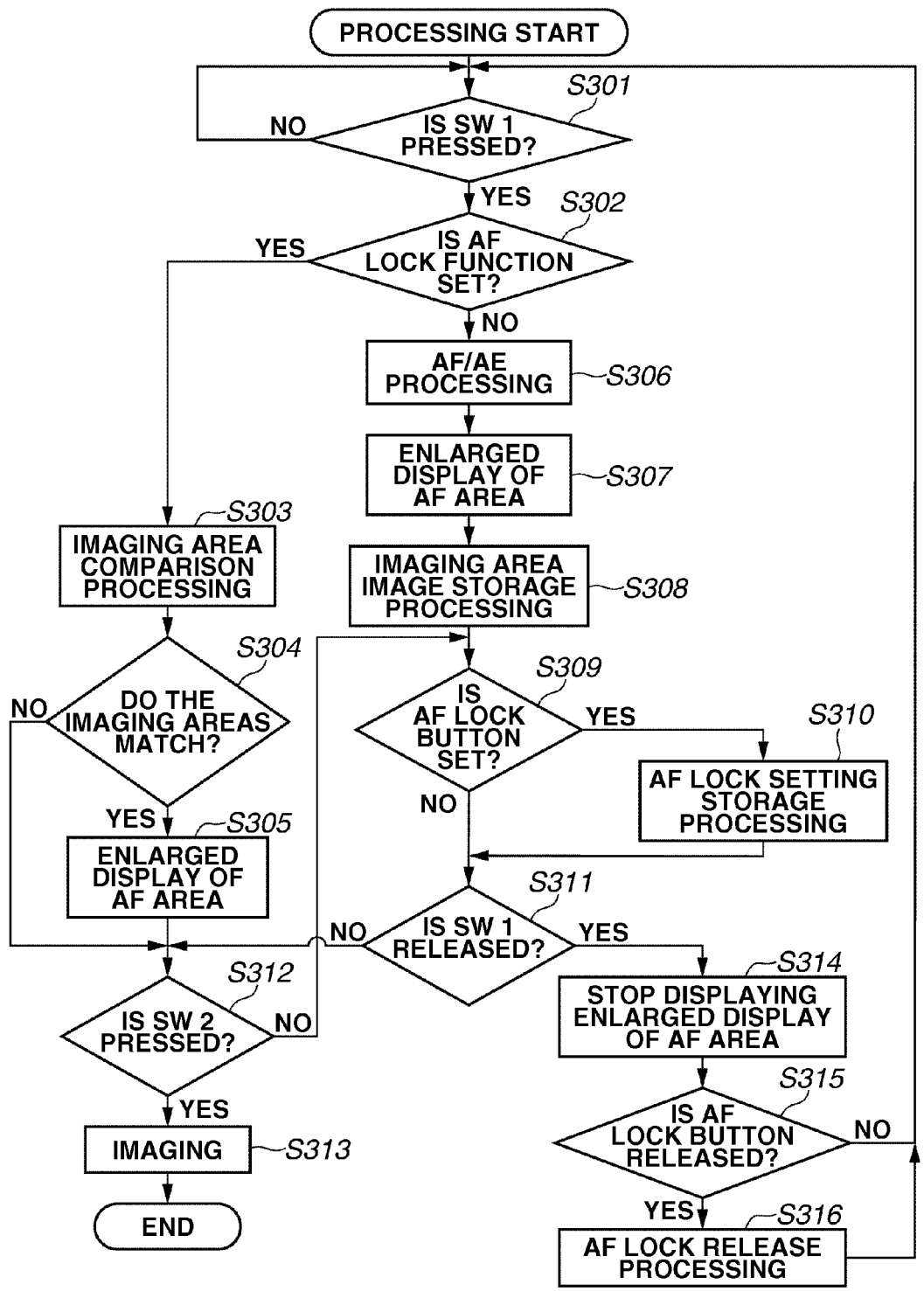
FIG. 3 is a flowchart of a process performed according to a second exemplary embodiment of the present invention.

FIG. 3 illustrates display and imaging processing of a camera according to a second exemplary embodiment of the present invention. A basic configuration of the camera according to the present exemplary embodiment is similar to that of the first exemplary embodiment except that the face detection unit 101 and the image comparison unit 102 are not included. Accordingly, in the description of the present exemplary embodiment, alphanumeric characters same as those referred to in the first exemplary embodiment are applied to the common parts.

In step S301, the system control unit 50 determines whether the imaging preparation switch (SW1) 62 is pressed. If the imaging preparation switch (SW1) 62 is not pressed (NO in step S301), then step S301 is repeated. If the imaging preparation switch (SW1) 62 is pressed (YES in step S301), then the process proceeds to step S302.

In step S302, the system control unit 50 determines whether the AF lock setting button 70a has been operated by the user prior to this step, and whether the camera 100 is in the AF lock state. If the camera 100 is not in the AF lock state (NO in step S302), then the process proceeds to step S306.

In step S306, the system control unit 50 executes the AF processing (focus control) with respect to the AF area set in advance using the focus control unit 42 and obtains an in-focus state. Further, using the exposure control unit 40, the system control unit 50 performs the AE processing so that the main object included in the AF area is appropriately exposed.

Next, in step S307, the system control unit 50 instructs the image display unit 28 to superpose and display an enlarged image of the AF area, which is a part of the imaging area, over the imaging area image.

Next, in step S308, the system control unit 50 stores the imaging area image (the first imaging area image) displayed at this time on the image display unit 28, in the internal memory 50a.

Next, in step S309, the system control unit 50 determines whether the AF lock setting button 70a is operated by the user. More specifically, the system control unit 50 determines whether the AF lock setting button 70a is operated while the enlarged image of the AF area of the imaging area including the main object is displayed on the image display unit 28 and the focus state is maintained. If the AF lock setting button 70a is operated (YES in step S309), then the process proceeds to step S310. In step S310, the system control unit 50 stores the data of the AF frame or the data indicating that the camera 100 is in the AF lock state in the internal memory 50a. At this time, the image display unit 28 can also display a message indicating that the camera 100 is in the AF lock state. After that, the process proceeds to step S311. In step S309, if the AF lock setting button 70a is not operated (NO in step S309), then the process proceeds to step S311.

In step S311, the system control unit 50 determines whether the imaging preparation switch (SW1) 62 is still pressed. If the imaging preparation switch (SW1) 62 is still pressed (NO in step S311), then the process proceeds to step S312.

In step S312, the system control unit 50 determines whether the image record switch (SW2) 64 is pressed. If the image record switch (SW2) 64 is not pressed (NO in step S312), then the process returns to step S309. If the image record switch (SW2) 64 is pressed (YES in step S312), then in step S313, the system control unit 50 performs the imaging processing (image record operation).

On the other hand, in step S311, if the imaging preparation switch (SW1) 62 is not pressed (YES in step S311), then the process proceeds to step S314. In step S314, the system control unit 50 finishes (cancels) the display of the enlarged image of the AF frame on the image display unit 28 and the camera 100 returns to the state where the normal imaging area image (EVF image) is displayed.

Next, in step S315, the system control unit 50 determines whether the user operated the AF lock release button (not shown) included in the operation unit 70 and the AF lock is released. If the AF lock is released (YES in step S315), then in step S316, the system control unit 50 performs the AF lock release processing. In the AF lock release processing, the system control unit 50 deletes the data of the AF area or the image data of the AF area stored in the internal memory 50a. If a message is displayed on the image display unit 28 indicating that the camera 100 is in the AF lock state, then the system control unit 50 removes such a message. After that, the process returns to step S301.

In step S315, if the AF lock is not released (NO in step S315), then the process returns to step S301.

In step S301, the system control unit 50 determines whether the imaging preparation switch (SW1) 62 is pressed.

In the check made by the control unit 50 when the process returns from step S315 to step S301, it is determined whether the camera 100 is in the AF lock state and, whether the imaging preparation switch (SW1) 62 is re-operated in a state the display of the enlarged image of the AF frame is cancelled. If the imaging preparation switch (SW1) 62 is re-operated (YES in step S301), then the process proceeds to step S302. If the imaging preparation switch (SW1) 62 is not re-operated (NO in step S301), then step S301 is repeated.

In step S302, if the camera 100 is in the AF lock state, the process proceeds to step S303.

In step S303, the system control unit 50 instructs the image comparison unit 102 to perform comparison processing of the imaging area image. To be more precise, the system control unit 50 instructs the image comparison unit 102 to detect whether the first imaging area image stored in the internal memory 50a in step S308 (at the time the imaging preparation switch 62 is re-operated) matches with the imaging area image (the second imaging area image) currently displayed on the image display unit 28. The image comparison unit 102 extracts a plurality of feature points of the first imaging area image stored in the internal memory 50a and feature points of the second imaging area image stored in the image display memory 24 to determine whether the first imaging area matches with the second imaging area image by comparing their coordinates or color information.

Next, in step S304, if the image comparison unit 102 determines that the first imaging area image matches with the second imaging area image (YES in step S304), then the process proceeds to step S305.

In step S305, the system control unit 50 displays an enlarged image of the AF area of the current imaging area including the main object that is focused at the time the AF lock is set. Then, the process proceeds to step S312.

On the other hand, in step S304, if the system control unit 50 determines that the first imaging area image does not match with the second imaging area image (NO in step S304), then the process proceeds to step S312 without displaying an enlarged image of the AF area.

Figure 9:
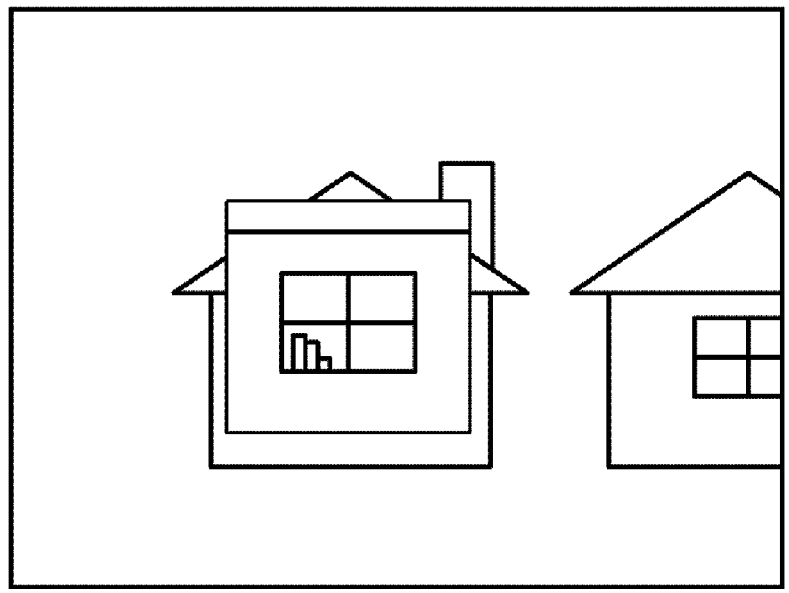
FIG. 9 illustrates an example of an image display according to the second exemplary embodiment of the present invention.
Figure 10:
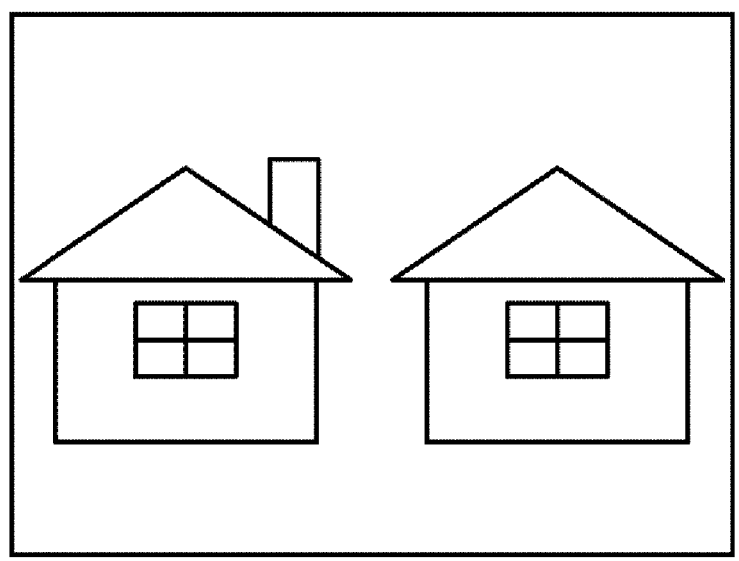
FIG. 10 illustrates another example of the image display according to the second exemplary embodiment of the present invention.

For example, as illustrated in FIG. 9, if the AF locking is performed in a state the center portion of the imaging area image is set as the AF area, and then the imaging composition is changed to, for example, the composition as illustrated in FIG. 10. The imaging composition in FIG. 10 is a composition chosen by the user to be actually photographed. Even if the imaging preparation switch (SW1) 62 is pressed again when the imaging composition is in a state illustrated in FIG. 10, the main object does not exist in the center portion of the AF area. Thus, it is meaningless to enlarge that area. For this reason, an enlarged image will not be displayed in such a case.

More specifically, according to the present exemplary embodiment, when the user changes the imaging composition after the AF locking is set (i.e., the first and the second imaging area images do not match with each other), an enlarged image will not be displayed even if the imaging preparation switch (SW1) 62 is re-operated. In this way, meaningless display of an enlarged image, which may cause user inconvenience, can be prevented.

Figure 4:
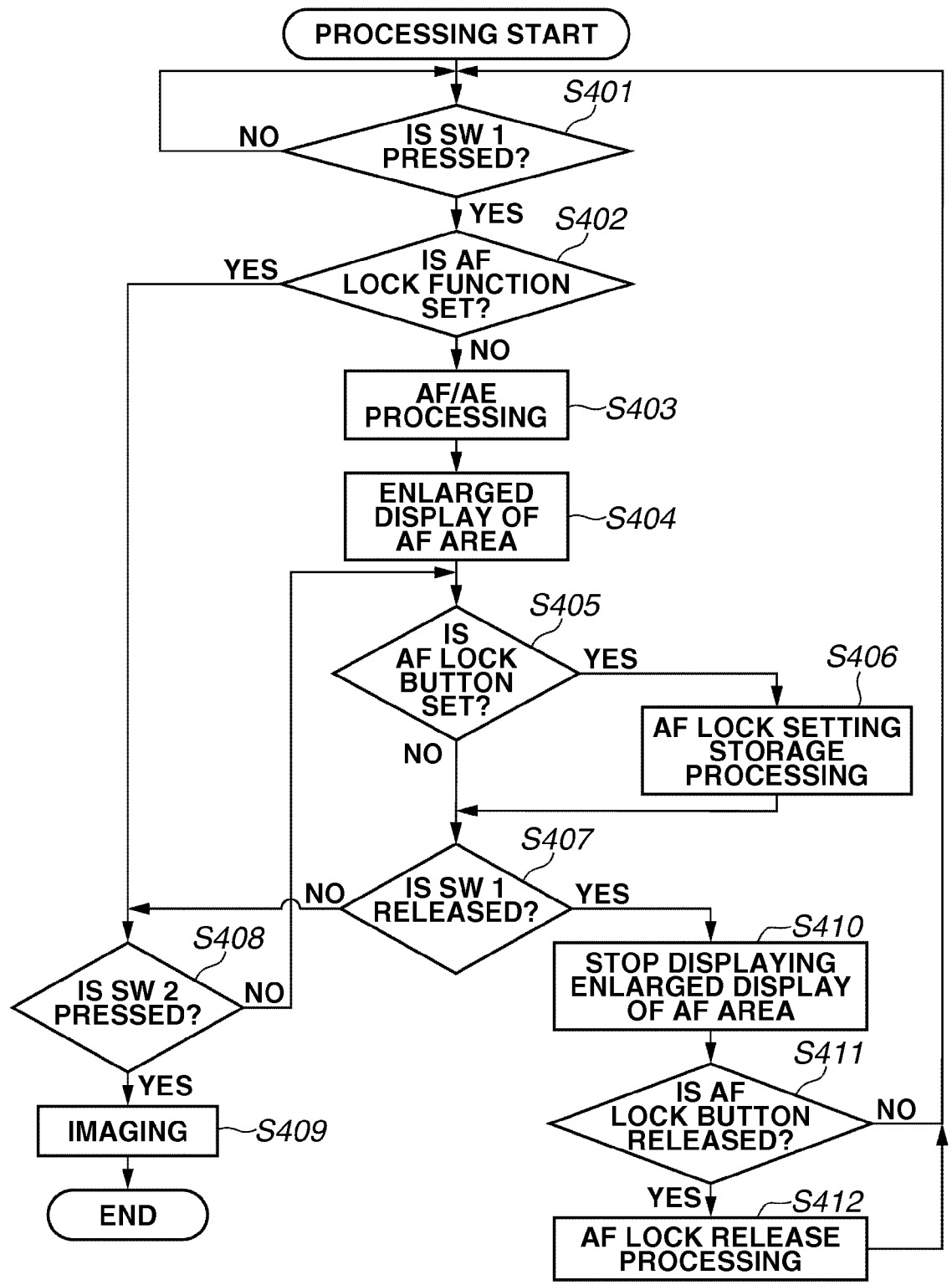
FIG. 4 is a flowchart of a process performed according to a third exemplary embodiment of the present invention.

FIG. 4 illustrates display processing and imaging processing of a camera according to a third exemplary embodiment of the present invention. A basic configuration of the camera according to the present exemplary embodiment is similar to that of the first exemplary embodiment except that the face detection unit 101 and the image comparison unit 102 are not included. Accordingly, in the description of the present exemplary embodiment, alphanumeric characters same as those referred to in the first exemplary embodiment are applied to the common parts.

In step S401, the system control unit 50 determines whether the imaging preparation switch (SW1) 62 is pressed (turned on). If the imaging preparation switch (SW1) 62 is not pressed (NO in step S401), then step S401 is repeated. If the imaging preparation switch (SW1) 62 is pressed (YES in step S401), then the process proceeds to step S402.

In step S402, the system control unit 50 determines whether the AF lock setting button 70a has been operated by the user prior to this step, and whether the AF lock function is set and the camera 100 is in the AF lock state. If the camera 100 is not in the AF lock state (NO in step S402), then the process proceeds to step S403.

In step S403, the system control unit 50 executes the AF processing (focus control) with respect to the AF area set in advance using the focus control unit 42 and obtains an in-focus state. Further, using the exposure control unit 40, the system control unit 50 performs the AE processing so that the main object included in the AF area is appropriately exposed.

Next, in step S404, the system control unit 50 instructs the image display unit 28 to display an enlarged image of the AF area, which is a part of the imaging area.

Next, in step S405, the system control unit 50 determines whether the AF lock setting button 70a has been operated by the user. More specifically, the system control unit 50 determines whether the AF lock setting button 70a was operated while the enlarged image of the AF area of the imaging area including the main object is displayed on the image display unit 28 and the focus state is maintained. If the AF lock setting button 70a was operated (YES in step S405), then the process proceeds to step S406. In step S406, the system control unit 50 stores the data of the AF frame and the data indicating that the camera 100 is in the AF lock state, in the internal memory 50a. At this time, the image display unit 28 can also display a message indicating that the camera 100 is in the AF lock state. After that, the process proceeds to step S407. In step S405, if the AF lock setting button 70a is not operated (NO in step S405), then the process proceeds to step S407.

In step S407, the system control unit 50 determines whether the imaging preparation switch (SW1) 62 is still pressed. If the imaging preparation switch (SW1) 62 is still pressed (NO in step S407), then the process proceeds to step S408. In step S408, the system control unit 50 determines whether the image record switch (SW2) 64 is pressed. If the image record switch (SW2) 64 is not pressed (NO in step S408), then the process returns to step S405. If the image record switch (SW2) 64 is pressed (YES in step S408), then in step S409, the system control unit 50 performs the imaging processing (imaging and recording operation).

On the other hand, in step S407, if the imaging preparation switch (SW1) 62 is not pressed (YES in step S407), then the process proceeds to step S410.

In step S410, the system control unit 50 finishes (cancels) the display of the enlarged image of the AF frame on the image display unit 28 and the camera 100 returns to the state where the normal imaging area image (EVF image) is displayed.

Next, in step S411, the system control unit 50 determines whether the user operated the AF lock release button (not shown) included in the operation unit 70 and the AF lock is released. If the AF lock is released (YES in step S411), then in step S412, the system control unit 50 performs the AF lock release processing. According to the AF lock release processing, the system control unit 50 deletes the data of the AF area stored in the internal memory 50a. If a message is displayed on the image display unit 28 indicating that the camera 100 is in the AF lock state, then the system control unit 50 removes such a message. After that, the process returns to step S401.

In step S411, if the AF lock is not released (NO in step S411), the process returns to step S401.

In step S401, the system control unit 50 determines whether the imaging preparation switch (SW1) 62 is pressed. In the check made by the control unit 50 when the process returns from step S411 to step S401, it is determined whether the camera 100 is in the AF lock state and, whether the imaging preparation switch (SW1) 62 is re-operated in a state the display of the enlarged image of the AF frame is cancelled. If the imaging preparation switch (SW1) 62 is re-operated (YES in step S401), then the process proceeds to step S402. If the imaging preparation switch (SW1) 62 is not re-operated (NO in step S401), then step S401 is repeated.

In step S402, if the camera 100 is in the AF lock state, the process proceeds to step S408. More specifically, when the camera 100 is in the AF lock state, even if the imaging preparation switch (SW1) 62 is re-operated in a state the display of the enlarged image is cancelled, the enlarged image of the AF area will not be displayed again.

In this way, once the user confirms details of the main object using the enlarged display of the main object in the AF area and then carries out the AF lock function, an enlarged image will not be displayed by the re-operation of the imaging preparation switch 62. In this way, the inconvenience of the user can be spared.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-011733 filed Jan. 22, 2008, which is hereby incorporated by reference herein in its entirety.

What is claimed is:

1. An imaging apparatus comprising:
an image sensor;
a first operation member operable by a user configured to issue an instruction for start of focus control;
a display control unit configured to display an imaging area image generated using output from the image sensor on a monitor;
a second operation member operable by the user configured to issue an instruction for maintaining a position of a focus lens after auto-focus control is performed; and
a storage unit configured to store a main object included in the imaging area image when a focus state is maintained according to an operation of the first operation member;
wherein the first and second operation members are operated before an image is captured for recording,
wherein, when the first operation member is operated, the display control unit displays an enlarged image of a portion of the imaging area image, on the monitor if the object stored in the storage unit is included in the imaging area, and
wherein when the first operation member is operated, the display control unit does not display an enlarged image of a portion of the imaging area image on the monitor if the object stored in the storage unit is not included in the imaging area.

2. The imaging apparatus according to claim 1, wherein the focus state is obtained by an operation of the second operation member, and the display control unit displays the enlarged image of the portion of the object included in the imaging area image according to the operation of the first operation member on the monitor after the focus state is released.

3. The imaging apparatus according to claim 1, wherein the display control unit displays the enlarged image of the portion of the object included in the imaging area image according to the operation of the first operation member on the monitor after the auto-focus control is performed.

4. An imaging apparatus comprising:

an image sensor;

a first operation member configured to issue an instruction for start of auto-focus control by controlling a focus lens;

a second operation member configured to issue an instruction for maintaining a position of the lens after auto-focus control is performed; and a display control unit configured to display an imaging area image generated using output from the image sensor on a monitor;

wherein the first and second operation members are operated before an image is captured for recording, wherein the display control unit displays an enlarged image of a portion of an object included in the imaging area image according to an operation of the first operation member on the monitor; and wherein the display control unit does not display the enlarged image of the portion of the object included in the imaging area, but displays the imaging area image on the monitor after the second operation member is operated, if the first operation member is operated.

5. The imaging apparatus according to claim 4, wherein the focus state is obtained by an operation of the second operation member, and the display control unit displays the enlarged image of the portion of the object included in the imaging area image according to the operation of the first operation member on the monitor after the focus state is released.

6. The imaging apparatus according to claim 4, wherein the display control unit displays the enlarged image of the portion of the object included in the imaging area image according to the operation of the first operation member on the monitor after the auto-focus control is performed.

* * * * *